Aug. 17, 1948.  W. H. ODLUM  2,447,085
WELDED JOINT
Filed May 11, 1944
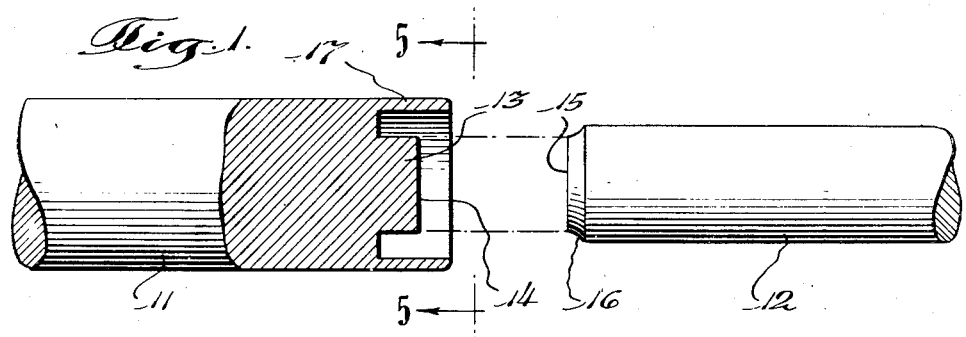
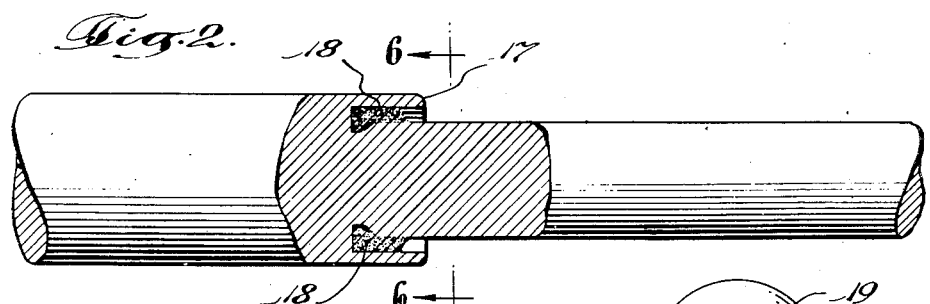
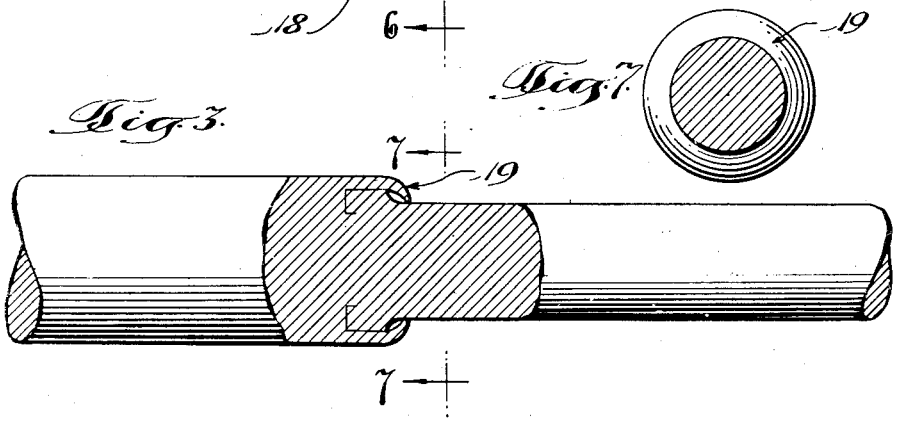
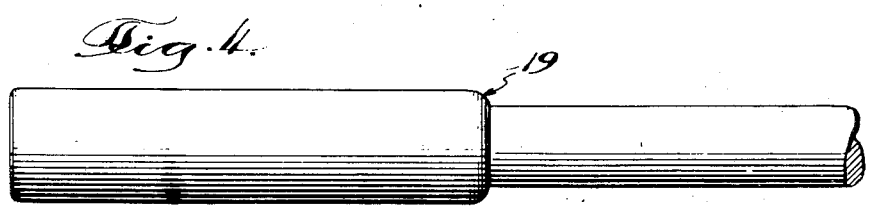
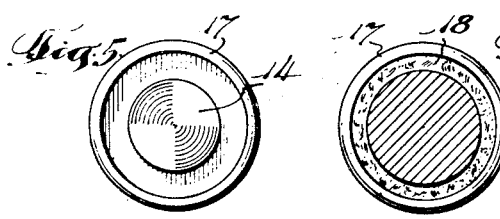
Inventor
William H. Odlum
By McCabe, Hendt & Dickinson
attorneys Patented Aug. 17, 1948

2,447,085

UNITED STATES PATENT OFFICE 2,447,085

WELDED JOINT

William H. Odlum, Wilmette, Ill., assignor to Duro Metal Products Co., Chicago, Ill., a corporation of Illinois Application May 11, 1944, Serial No. 535,014

3 Claims. (Cl. 287—20.2)

My invention contemplates and provides an electrically welded joint (for example a joint between a tool handle and its shank) that presents a neat and finished appearance despite that its welding flash has not been removed.

The salient object of the invention is to provide a satisfactory electrically welded joint in which retained flash is effectively concealed.

The aforementioned and other objects, features and advantages of the invention will appear from the following description wherein reference is made to the accompanying sheet of drawings in which:

Figure 1 is a side view, partly in section, depicting two metal members as they appear when made ready to be joined together in accordance with the present invention;

Fig. 2 is a side view, partly in section, illustrating the same metal members as they appear immediately after being electrically welded together;

Fig. 3 is a view similar to Fig. 2 illustrating how I conceal the welding flash;

Fig. 4 is a side elevational view of the welded-together members as they appear after the completion of the new joint;

Fig. 5 is an end view which may be considered as taken in the plane of the line 5—5 of Fig. 1 and looking in the direction indicated by the arrows;

Fig. 6 is a transverse view, partly in section and partly in elevation, which may be regarded as taken in the plane of the line 6—6 of Fig. 2 and looking in the direction indicated by the arrows; and Fig. 7 is a transverse view, partly in section and partly in elevation, which may be regarded as taken on the line 7—7 of Fig. 3 and looking in the direction indicated by the arrows.

Similar characters of reference refer to similar parts throughout the several views.

Referring first to Figs. 1 and 5, at 11 and 12 I have illustrated metal members that have been made ready to be joined together in accordance with the present invention. When joined together, they may constitute, for example, the handle and shank portions of a tool. It will be noted that one end of member 11 has been hollow-milled to present a central projection or integral boss 13. The end face 14 of projection 13 has a diameter substantially equal to the diameter of the opposed end face 15 of member 12. Member 12, as I have chosen to depict it, has a diameter somewhat greater than the diameter of projection 13 and has been shouldered at 16 so that the opposed end surfaces 14 and 15 may have equal diameters. The milling of member 11 has left it with an integral annular lip 17 coaxial with and spaced from projection 13 and extending substantially beyond the face 14 thereof.

It may be assumed that the members 11 and 12, as shown in Fig. 1, are held in the electricity-conducting jaws of a conventional or other suitable electrical welding machine (not shown) capable of being operated to effect relative axial movement of members 11 and 12, to force their faces 14 and 15 together, to hold member 12 equidistantly spaced all around from lip 17, and suitably to cause welding current to flow between such faces 14 and 15 as they approach each other.

Figs. 2 and 6 illustrate the parts as they appear after being welded together with the aid of a suitable electrical welding machine. It will be noted that the welding flash 18 (i. e., the arc deteriorated metal extruded hot from between member 12 and projection 13 as their weld is effected) occupies what formerly was the annular space between projection 13 and lip 17. An advantage of providing member 12 with shoulder 16 (although the shoulder is not indispensable) is that the flash, resultant from the burning away of the opposed ends of member 12 and projection 13, is by the shoulder rolled back into the aforementioned space as and while the weld is being effected. The form of the shoulder may vary—as shown in Fig. 1 it presents a slightly concave annular surface. By reference to Fig. 2 it also will be noted that all of the flash lies well back from the edge of lip 17.

The joint of the present invention is now completed, as depicted in Figs. 3, 4 and 7, by so rolling or crimping the lip 17 that its edge is caused to lie against or immediately adjacent to member 12 to provide a finishing shoulder 19 that effectively conceals the welding flash 18.

That my new joint permits the welding flash to be concealed in situ without there existing any necessity for removing any part of it by grinding or otherwise, is an advantage of substantial practical value. Hitherto the joining by electrical welding of a tool handle and its shank (or other corresponding metal parts) has been followed by a grinding operation to remove the flash, the grinding operation being expensive and frequently resulting in objectionable diameter reduction at the weld when all of the metal deteriorated by the welding arc has been removed.

Having thus illustrated and described my invention, what I claim as new and desire to secure by Letters Patent of the United States is:

1. The method of endwise joining two solid bar members having different end sizes which comprises the steps of hollow milling the end of the member having the larger end size to provide a central protuberance and a surrounding wall spaced from the protuberance and extending outwardly beyond the protuberance to define a channel and an adjoining opening of larger size than the end of the smaller member, moving the end of the smaller member into said opening to abutment with the protuberance without contacting said wall while causing welding current to pass between the protuberance and smaller member during the application of force urging the smaller member against the protuberance thereby to cause the welding flash to fill said channel, confining welding flash to the inner portion of said opening away from the ends of said outwardly extending wall, and then concealing said flash by forming the end portion of said extending wall inwardly to the surface of the smaller member.

2. The method of joining two members in endwise relation, the ends of which members to be adjoined are substantially cylindrical and of different diameters, comprising the steps of hollow milling the end of the member having the larger diameter to provide a cylindrical axial protuberance and a relatively thin wall spaced from the protuberance and having a lip extending axially beyond the protuberance to define a channel and an adjoining cylindrical opening of larger diameter than the end of the smaller member, shouldering the end of the smaller member to provide a flash roll-back surface thereon adjacent the end and to make the end diameter thereof substantially equal to that of said protuberance, moving the shouldered end of the smaller diameter member toward and against said protuberance without contacting said lip and while causing welding current to pass between said protuberance and the smaller diameter member, confining the welding flash metal well within the axially extending lip, and then concealing the welding flash by rolling the end portion of the extending lip radially inwardly to the surface of the smaller diameter member.

3. A pair of bar members having cylindrical portions of different diameters integrally joined in coaxial end-wise relationship, an annular wall integral with the larger diameter end portion projecting therefrom in spaced-from and sleeving relationship to the smaller diameter portion and an annulus of welding flash occupying the space between said wall and said smaller diameter portion, said wall turning inwardly to the cylindrical surface of the smaller diameter portion and concealing the welding flash in said space.

WILLIAM H. ODLUM.

REFERENCES CITED

The following references are of record in the file of this patent:

UNITED STATES PATENTS

| Number | Name | Date |
|---|---|---|
| 396,013 | Thomson | Jan. 8, 1889 |
| 1,035,020 | Lanz | Aug. 6, 1912 |
| 1,121,619 | Ellery | Dec. 22, 1914 |
| 1,604,531 | Murray | Oct. 26, 1926 |
| 1,638,546 | Murray | Aug. 9, 1927 |
| 1,648,026 | Murray | Nov. 8, 1927 |
| 1,714,690 | Nevins | May 28, 1929 |
| 1,898,814 | Charlton | Feb. 21, 1933 |
| 2,112,673 | Lewis | Mar. 29, 1938 |
| 2,127,969 | Dingworth | Aug. 23, 1938 |
| 2,245,298 | Proctor | June 10, 1941 |
| 2,266,593 | Emmons | Dec. 16, 1941 |
| 2,268,416 | Nelson | Dec. 30, 1941 |
| 2,355,579 | Swing | Aug. 8, 1944 |

FOREIGN PATENTS

| Number | Country | Date |
|---|---|---|
| 546,737 | Great Britain | July 28, 1942 |